(12) United States Patent
Hillen et al.

(10) Patent No.: US 9,629,514 B2
(45) Date of Patent: Apr. 25, 2017

(54) TRAVELING CLEANING APPLIANCE AND METHOD FOR OPERATING SUCH AN APPLIANCE

(71) Applicant: Vorwerk & Co. Interholding GmbH, Wuppertal (DE)

(72) Inventors: Lorenz Hillen, Wuppertal (DE); Martin Meggle, Herzebrock (DE); Benjamin Strang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 549 days.

(21) Appl. No.: 14/096,355

(22) Filed: Dec. 4, 2013

(65) Prior Publication Data

US 2014/0166047 A1 Jun. 19, 2014

(30) Foreign Application Priority Data

Dec. 5, 2012 (DE) .................. 10 2012 111 792

(51) Int. Cl.
| | |
|---|---|
| *A47L 11/40* | (2006.01) |
| *A47L 9/30* | (2006.01) |
| *G05D 1/02* | (2006.01) |

(52) U.S. Cl.
CPC ............ *A47L 11/4061* (2013.01); *A47L 9/30* (2013.01); *A47L 11/4011* (2013.01);
(Continued)

(58) Field of Classification Search
CPC ............ A47L 2201/00; A47L 2201/04; A47L 9/2805; A47L 11/4011; A47L 11/4061; A47L 9/30; A47L 2201/06; G05D 1/0274
See application file for complete search history.

(56) References Cited

U.S. PATENT DOCUMENTS

| 5,815,880 A | 10/1998 | Nakanishi |
| 2005/0000543 A1* | 1/2005 | Taylor .................. G05D 1/0219 134/18 |

(Continued)

FOREIGN PATENT DOCUMENTS

| DE | 102 42 257 A1 | 4/2003 |
| DE | 103 57 637 A1 | 7/2005 |

(Continued)

OTHER PUBLICATIONS

European Search Report in EP 15 17 8218 dated May 11, 2016.
European Search Report in EP 15 17 8218 dated Sep. 6, 2016.

*Primary Examiner* — Robert Scruggs
(74) *Attorney, Agent, or Firm* — Collard & Roe, P.C.

(57) ABSTRACT

A traveling cleaning appliance or floor care appliance or floor treatment appliance is provided with a device for creating photographic pictures of a surface to be traveled on. A picture is evaluated for the type of a floor covering for differentiating between a hard floor covering and a carpeted floor. An identified floor covering is used for a traveling strategy and/or for a setting of cleaning parameters. Further, a method for operating an automatically traveling floor cleaning appliance which has a device for creating photographic pictures of a floor surface to be traveled on includes evaluating pictures that have been taken with regard to the type of floor covering. In dependence on an evaluation, a traveling strategy and/or setting of cleaning parameters such as floor clearance and/or size of secondary air openings and/or brush speed is carried out.

16 Claims, 7 Drawing Sheets

(52) U.S. Cl.
CPC ........ *G05D 1/0274* (2013.01); *A47L 2201/06* (2013.01); *G05D 2201/0203* (2013.01)

(56) References Cited

U.S. PATENT DOCUMENTS

| | | | |
|---|---|---|---|
| 2007/0267570 A1* | 11/2007 | Park | ........................ A47L 9/009 250/221 |
| 2013/0152970 A1* | 6/2013 | Porat | .................... E04H 4/1654 134/18 |
| 2014/0166047 A1 | 6/2014 | Hillen et al. | |

FOREIGN PATENT DOCUMENTS

| | | |
|---|---|---|
| DE | 10 2008 014 912 A1 | 9/2009 |
| DE | 10 2009 024 990 A1 | 12/2010 |
| DE | 10 2009 059 217 A1 | 2/2011 |
| DE | 10 2009 052 629 A1 | 5/2011 |
| DE | 10 2010 000 174 A1 | 7/2011 |
| DE | 10 2010 015 941 A1 | 9/2011 |
| DE | 10 2010 016 553 A1 | 10/2011 |
| EP | 2 471 426 A2 | 7/2012 |
| EP | 2 741 483 A2 | 6/2014 |
| WO | 2005/055795 A1 | 6/2005 |

* cited by examiner

TRAVELING CLEANING APPLIANCE AND METHOD FOR OPERATING SUCH AN APPLIANCE

CROSS REFERENCE TO RELATED APPLICATIONS

Applicant claims priority under 35 U.S.C. §119 of German Application No. 10 2012 111 792.6 filed on Dec. 5, 2012, the disclosure of which is incorporated by reference.

The invention relates in first instance to a traveling cleaning appliance or a floor care appliance or floor treatment appliance such as, for example, an automatically traveling floor cleaning appliance or a user-guided floor cleaning appliance, that is provided with a device for creating photographic pictures of a surface to be traveled on.

The invention further relates to a method for operating a traveling cleaning appliance, for example, an automatically traveling floor cleaning appliance or user-guided floor cleaning appliance, that has a device for creating photographic pictures of a surface to be traveled on.

Cleaning appliances of the kind in question are known, in particular in the form of attachments for hand-guided household vacuum cleaners or automatically traveling robots for cleaning and/or maintaining floors or floor coverings. For instance, an automatically traveling floor cleaning appliance is known from DE 10357637 A1 which is preferably further adapted for wet floor cleaning, particularly of hard floor coverings such as, for example, tiled floors. A robotic vacuum cleaning/sweeping appliance is known, for example, from DE 10242257 A1. However, with regard to the appliance, this can also be a robotic lawn mower, for example.

Such appliances in the form of cleaning appliances are also known as so-called above-floor appliances, for instance in the form of upholstery cleaning appliances or window cleaning appliances.

Moreover, cleaning appliances are also known in the form of automatically traveling floor cleaning appliances having a camera, in particular a digital camera, so as to create photographic pictures of the surface to be traveled on, particularly of the floor surface, and more particularly of the floor surface area in front of the appliance in the usual direction of travel of the appliance so as to detect drop-offs, such as, for example, stairs, in due time.

Against the background of the abovementioned prior art, the invention is concerned with the object of providing a traveling cleaning appliance, treatment appliance or floor care appliance, as well as a method for operating such an appliance, that enables an advantageous adjustment of the appliance with regard to the surfaces to be treated.

One possible solution to achieve the object according to a first inventive concept is embodied in a cleaning appliance that is based on the fact that a photographic picture can be evaluated with regard to surface formation type, for example, of a floor covering, and that an identified surface formation can be used with regard to a traveling strategy and/or with regard to the setting of cleaning parameters, such as floor clearance and/or size of secondary air openings and/or brush speed.

Concerning the method, it is proposed in this regard that photographic pictures be evaluated with respect to surface formation type and that, in dependence on an evaluation, a traveling strategy and/or setting of cleaning parameters, such as floor clearance and/or size of secondary air openings and/or brush speed, is carried out.

The evaluation of the surface traveled on enables, for example, a differentiation between ceramic surfaces, stone surfaces, tile or glass surfaces, natural wood or laminate surfaces, plastics surfaces or others, such as, for example, fabric surfaces and short- or long-pile carpet surfaces.

In traveling cleaning appliances, such as, for example, autonomously operating floor cleaning appliances, a frequently occurring problem is limiting the cleaning activity to one or more given surface areas or adapting them thereto. For instance, in the case of robots for wet floor cleaning, so-called wiping robots, it must be ensured that they do not apply water or moisture onto floor coverings that do not tolerate water or moisture, such as carpeted floors, for example.

According to the proposed solution, it is possible through the targeted use of digital image processing and on the basis of predetermined features to identify and classify surfaces captured in the pictures with regard to differences in their properties. Through these differences, it is made possible to take appropriate measures with regard to the cleaning appliance. If, for example, a rotatable brush is available, such a measure can consist of setting the brush speed; if a suction fan is available, the measure can consist of setting the suction power; or if a water or moisture application device is available, the measure can consist of setting the moisture release. However, a measure can also consist of interrupting the entire cleaning process or, particularly in the case of automatically operating floor cleaning appliances, leaving or avoiding the identified floor surface. The above-described measures can also be combined; for instance, the brush speed setting can be combined with a suitable suction power setting.

The input information preferably is a digital photo of the surface to be traveled on by the cleaning appliance, and optionally of the floor surface on which the appliance is currently traveling. The camera provided on or in the appliance can be oriented such that the surface directly in front of the appliance in the usual direction of travel can be captured photographically. However, the camera can also be arranged or oriented on the underside of the appliance, thus serving primarily to capture the surface on which the appliance is currently traveling.

Photographic pictures are also preferably created regularly, more preferably in defined intervals of up to 2 seconds, more preferably of up to 1 second, it being further preferred in this respect that the interval between two photographic pictures be dependent on the travel speed of the appliance. In this way, more pictures per time unit are provided at higher travel speeds than at lower travel speeds.

The preferably digital photo is evaluated by software, particularly with regard to the reflectivity and/or with regard to a pattern identified in the photo, it being further preferred that said software runs on a microprocessor/microcontroller. In a preferred embodiment, comparative values or comparative patterns for these determined values or patterns are available within a database, with cleaning parameters being associated with these comparative values. This enables, for example, a differentiation between a carpeted floor and a hard floor covering.

Furthermore, according to the proposed solution, it is possible to limit the work area of automatically traveling floor cleaning appliances without the need to prepare the ground, i.e., the floor to be traveled on, and the surroundings with markers, and also preferably without the use of maps of the surroundings. The appliance can be set not to leave a carpeted floor or hard floor covering. Moreover, by using digital image processing, automatic selection of suitable cleaning modes by the appliance can be achieved, thus resulting in an improved cleaning result while achieving a preferably advantageous level of energy efficiency at the same time.

Additional or alternative features in connection with the proposed method can also be derived from the description of appliance-related features. The same also applies vice versa.

For example, a provision is made in a preferred embodiment that the evaluation can be carried out in the cleaning appliance itself. Preferably, software required for evaluating the photographic pictures, in particular a digital image, is contained in an electronic memory, more preferably in a non-volatile memory of the traveling appliance, for example of the cleaning appliance. More preferably, said image can also be evaluated with a microcontroller that is provided on the appliance. It is also preferred that the commands for setting cleaning or treatment parameters or the traveling strategy be generated in the appliance itself. For example, such commands can be converted immediately into brush-related control signals or the like. However, they can also be indicated to a user, for example, to make a change and/or to give approval.

In an alternative embodiment, the evaluation is carried out externally in relation to the cleaning appliance, for instance by means of preferred wireless transmission of the photographic picture created by the cleaning appliance to a preferably stationary or mobile device. A stationary device can be, for example, a charging station of an automatically traveling floor cleaning appliance, at which station charging of the rechargeable batteries of the appliance can preferably occur. Furthermore, as an alternative, the evaluating device can be a computer, such as a PC, notebook, tablet PC or even a smartphone, it being additionally preferred that a wireless connection be provided, for example WLAN or Bluetooth. It is preferred here that a bidirectional communication between the cleaning appliance and the device evaluating the picture be provided so that commands for setting the traveling strategy and/or the cleaning parameters can be transmitted to the cleaning appliance via the same wireless connecting paths.

Moreover, the interaction can also take place in the sense of a "smart home," for example by utilizing a television set for visualizing the results. In a further embodiment, the cleaning appliance itself can have a display and control elements.

In a further preferred embodiment, the surface to be captured photographically can be illuminated by a lighting element that is provided in the cleaning appliance. In one embodiment, this is a conventional lamp, for example, a halogen lamp or preferably a white LED. It is further preferred in this context that the lighting element emits a defined white light.

Additionally or alternatively, illuminating can also be carried out by infrared light.

Also alternatively or in addition, the camera operates in the non-visible spectral range. This reduces influences of extraneous light and, in addition, can contribute aspects for evaluation. Accordingly, the light emitted from the lighting element is also adapted with regard to its spectral values to the operating range of the camera.

Moreover, it is preferred that the picture be a color picture and can be evaluated with regard to the color.

Furthermore, alternatively or in addition, the evaluation with regard to overexposed areas (in particular white areas) can be carried out in one image. Thus, surfaces that are sealed, for example, i.e., that are waterproof and smooth to the greatest possible extent, have a high gloss and therefore high reflectivity.

Gloss measurements and color measurements for surface characterization are well known. Gloss as an indicator for a sealed surface can also be detected in a digital picture. Carpeted floors, i.e., corresponding floors with a carpet having pile threads, do not show a glossy core area in the respective digital picture since the carpet fibers greatly scatter the light, resulting in a diffuse reflection.

For example, wood floors or other floors with characteristic patterns or grains can also be identified via the evaluation, the corresponding areas in the color space being determined via statistical methods. Thus, an analysis of the color distribution within a picture is preferably provided by counting how many pixels of the image are within a predetermined color range that represents wood.

For analyzing a joint structure, for example that of a tiled floor, two approaches are particularly provided.

Accordingly, depth information can be calculated from two images (either captured simultaneously using a stereo camera system or in chronological succession using a monocular camera system; however, the camera systems are relevant independent of this).

The algorithms required for this are known as textbook knowledge. In the depth image, for example, tiles are visible as smooth surfaces in a single plane. Joints are visible as interruptions and minor indentations. Optionally, predetermined data about conventional widths of joints, for example, are also included in the analysis.

Alternatively or in addition to this depth information analysis, it is also possible to perform an analysis of edge and angle information. Joints are visible in the image as relatively long edges which usually run in two preferential directions that are orthogonal to one another. Detecting the edges and estimating the edge orientation can be carried out by means of known edge filters (e.g., Sobel filter or Canny filter). Approaches for suppressing short edges are also known. This approach is particularly suitable for monocular camera systems. If a downwardly oriented camera system is used here, the right angles between the joints are also imaged as such. Moreover, the width of the joints can also be evaluated.

The floor plane on which the cleaning appliance moves can be adapted on the basis of depth information. In the case of very smooth or flat surfaces, there are hardly any deviations from this plane; however, in the case of long-pile soft floorings, there are usually significant deviations between the actual height in the depth image and the adapted plane.

Moreover, known methods for texture analysis are also provided. Filter banks consisting of Gabor filters, for example, are frequently used for this purpose. With suitable parameterization of the filters, longer edge segments can be detected. If they are distributed over the entire surface and largely oriented in a preferential direction, there is a high probability that it is grained wood.

Moreover, the characteristic fiber structure of a carpeted floor can also be identified; this is also possible in particular through identification based on a known pattern.

By using a plurality of features, i.e., feature combinations, the risk of misclassification can be reduced significantly.

Alternatively or in addition to the automatic evaluation of the photographic picture by the cleaning appliance or an external device that communicates with the cleaning appliance, a provision is made in a refinement of the subject matter of the invention that a picture of the surface can be defined by the user as whether to be traveled on or not to be traveled on. Thus, in one embodiment, prior to starting the operation of the cleaning appliance, the user shows to the appliance those surfaces that are to be avoided (creation of a negative list) and/or the surfaces on which the appliance is allowed to stay/should stay (creation of a positive list). In an exemplary living space environment, the user preferably prepares lists on-site by placing the appliance down onto the respective floor coverings, letting the appliance characterize the floor covering, and adding this floor covering to the positive or negative list.

In a preferred embodiment, positive and/or negative lists are stored in a non-volatile memory of the cleaning appliance and/or in the associated base station and/or in a computer or the like that directly or indirectly communicates with the appliance via the base station, for example.

The cleaning appliance is preferably equipped with a monocular camera system that faces forwards in the direction of travel or, more preferably, faces directly downwards. Thus, it is further preferred that the arrangement of such a camera be provided in the bottom region of the cleaning appliance. Monocular camera systems consist of a single camera. With only one camera picture, such a system can deliver only intensity information. For calculating depth information, two successively captured images are preferably included in the calculation.

Alternatively, it is also possible to actively project a light pattern, for example by means of laser lines or infrared spots, whose position within the image enables deduction of the depth information and hence the 3D structure of the surface that is currently being traveled on.

In another preferred embodiment, the appliance has a plurality of devices for creating photographic pictures, i.e., a plurality of in particular digital cameras which, more preferably, photograph preferably the same surface area at different camera angles and/or from different directions. This preferably results in a stereo camera system. The two or more cameras provided are arranged offset to one another with the field of view partially overlapping. Such a stereo camera system delivers intensity information and enables the calculation of depth information in the overlap area of the fields of view without having to rely on chronologically successive camera images.

Moreover, a camera system that faces forwards in the usual direction of travel can also be used for other purposes, such as, for example, for navigating an automatically traveling cleaning appliance or for controlling through gestures of the user.

A camera system that faces downwards is preferably used only for surface classification. By virtue of the preferred arrangement in the region of the appliance bottom, an advantageous shielding of the camera system against environmental influences, such as, for example, changes in illumination or reflections on the surface can be achieved. Constant lighting conditions can be achieved by active illumination, for example with LEDs.

The one or more cameras can be configured in terms of their position, height alignment, and more preferably also with regard to the view angle and the viewing direction.

In terms of the method, it is preferred that, prior to carrying out a traveling strategy or the like and in dependence on an evaluation of the pictures, traveling over a surface to be cleaned is carried out while creating the pictures, but with no immediate reaction taking place to surface formations detected as being different. During this learning or exploration phase, particularly if the cleaning appliance is embodied as an automatically traveling cleaning appliance, the entire floor of a living space or an apartment is preferably traveled over for scanning the floor at the same time.

During this learning or exploration phase, data on preferably all occurring surface formations (floor types) can be recorded via the one or the plurality of cameras and the provided evaluation unit.

In the case of an embodiment of the cleaning appliance as an automatically traveling cleaning appliance, traveling for recording data is carried out automatically or under the guidance of the user, for example, guidance via remote control.

An autonomous exploration is preferably based here on a traveling strategy for cleaning floor surfaces, particularly according to DE 102010000174 A1. The content of this patent application is hereby included in full in the disclosure of the present invention, including for the purpose of incorporating features of this patent application in claims of the present invention.

During such an exploration, traveling preferably takes place over the entire living space so that it is ensured that all floors present are recorded for the data collection. It is not necessary here for the user to monitor the exploration.

During a user-guided exploration (teach-in), the automatically traveling cleaning appliance is preferably remote-controlled by the user, for example, by using a remote control or a mobile computer. Such user-guided traveling is also known from DE 102009024990 A1 or also from DE 102009052629 A1. The content of these patent applications is also hereby included in full in the disclosure of the present invention, including for the purpose of incorporating features of these patent applications in claims of the present invention.

During the user-guided exploration, the user has to ensure that all floors within the living space are sufficiently recorded. Accordingly, continuous monitoring of the automatically traveling cleaning appliance is required during such traveling for scanning.

The created pictures are preferably analyzed by means of an evaluation software, optionally at a time following traveling over the surface. This analysis is preferably carried out in the course of an evaluation phase in which the collected data are categorized by means of the evaluation software into different floor types, for example tiles, laminate, parquet flooring or soft flooring, each of which requires different cleaning (for example, intense wet wiping, gentle wet wiping, only vacuum cleaning). In this way, each floor or floor section is associated with a unique floor type.

The categorization of the collected sensor data into different floor types is preferably performed on the basis of features specified by the manufacturer. Features that can be used are, for example, intensity information (for example, color, grey scale values, texture, pattern, gloss or contrast), features derived from depth information (for example, smoothness of the floor, surface structure of the floor, or the presence of joints), or combinations thereof.

The evaluation phase takes place either after the learning or exploration phase (offline method) or parallel thereto (online method). In the case of the online method, the floor classification is preferably performed only after all data of all floor coverings in the living space have been collected. In the case of the offline method, in contrast, floor classification is performed immediately in the course of the learning or exploration phase.

In another preferred embodiment, a result of the evaluation is visualized for the user on a display or communicated using a voice output. Accordingly, the user can confirm the correctness of the classification or make corrections if necessary.

Visualizing the results and the interaction with the user can be carried out by a mobile terminal, by a traditional computer, or by a display and control elements which are provided directly on the cleaning appliance.

For each detected floor, the floor is preferably presented to the user in the form of a photo (picture) or as a marked area in a map of the surroundings, with the floor type proposed by the system and the cleaning parameters provided by the system for this floor type. Based on this presentation, the user can confirm the classification or can change it. In this way, potential misclassifications are revealed and corrected, thus avoiding the risk of incorrect cleaning.

Thus, the pursuit of a traveling strategy in dependence on a performed evaluation takes place only after the user confirms the result of the evaluation communicated to the user. The configuration generated in this manner is preferably permanently stored in the cleaning appliance and can be used during the cleaning phase. Accordingly, the above-described steps, such as learning or exploration phase, evaluation phase and confirmation by the user, do not have to be carried out before each cleaning run.

However, if the automatically traveling cleaning appliance is transported into another environment, it can be required or expedient to expand the configuration or to create a new configuration.

During the cleaning phase, the cleaning appliance systematically travels over the entire floor surface of a room or a plurality of rooms and cleans the floor surface according to the cleaning parameters configured in the previous step. Here, the cleaning phase can take place immediately after the preceding steps. However, the cleaning phase can also be carried out independently of these steps, since the configuration created in the above-described steps is permanently stored in the cleaning appliance. The traveling strategy described in DE 102010000174 A1 is preferably used as the cleaning strategy.

Different approaches are possible for adapting the cleaning parameters according to the configuration stored in previously performed steps.

Thus, it is preferred in first instance to set the cleaning parameters according to the current position of the cleaning appliance in the room. For this purpose, the automatically traveling cleaning appliance continuously detects its location by means of the map of its surroundings that is known to the cleaning appliance so that its position can be determined. In this case, the adaptation of the cleaning parameters takes place independently of the provided and described sensor system for detecting and evaluating surfaces.

Alternatively, the adaptation of the cleaning parameters takes place by continuously scanning the surface on which the automatically traveling cleaning appliance is currently traveling by means of the sensor system and by continuously classifying the current sensor data. The cleaning parameters are immediately set here based on the currently identified floor type. Such a system can work without localization of the cleaning appliance in the surroundings and independently of a map of the surroundings.

A combination of the above-described approaches is preferred. Accordingly, it is preferred that, when executing a cleaning run on a surface which has already been traveled over for analysis and has been analyzed, additional pictures are created and evaluated. The cleaning appliance detects its location in the map of the surroundings, takes over the configuration stored for the position, and verifies this configuration with the currently determined sensor data from the photographic pictures. If stored configurations and currently detected configurations do not match, a reaction takes place, for example, in the form of a message to the user. Alternatively or in combination with this, universally, applicable cleaning parameters can be used in such a case for this surface area ("gentle cleaning"). This area can also be left uncleaned.

In one embodiment, the described system, particularly consisting of a camera system and a minicomputer for evaluating sensor data, is constructed as a sensor module which, besides being used in an automatically traveling cleaning appliance, can also be used in attachments for household floor vacuum cleaners or attachments for hand-held vacuum cleaners or above-floor cleaning appliances.

Such a system can also be used for avoiding user errors as a result of improper cleaning. Thus, in the case of incorrect cleaning, such a system can provide the user, for example, with visual feedback (for example, a red light), an optical feedback (for example, shaking of the handle) or, alternatively, it can switch off the cleaning appliance.

Furthermore, such a sensor module can be used for automatically adapting the suction power of a traditional vacuum cleaner to the surface to be cleaned (for example, drapes, upholstery, work surfaces etc.).

Furthermore, the above-described features can also be used for so-called robotic lawn mowers so as to ensure in particular that the robot moves only on a lawn. By evaluating the image of the ground surface being traveled on, traveling of the appliance into areas adjoining the lawn is avoided. Evaluating the photographic picture takes place here by means of identification in the color space and/or via the structure. Here, the identification of lawns via the color space proves to be advantageous since here, a characteristic area is defined by the dye (chlorophyll). Also, the lawn structure shows a clear pattern, which is preferably used as additional information to the color space information.

With regard to the positive and/or negative list to be created by the user in one embodiment, it proves to be further advantageous in this regard if, in the case of a robotic lawn mower, the picture of the floor surface "lawn" is already entered in a positive list by the manufacturer.

The invention is explained below with reference to the accompanying drawing, which merely shows an exemplary embodiment. In the figures.

Figure 1:
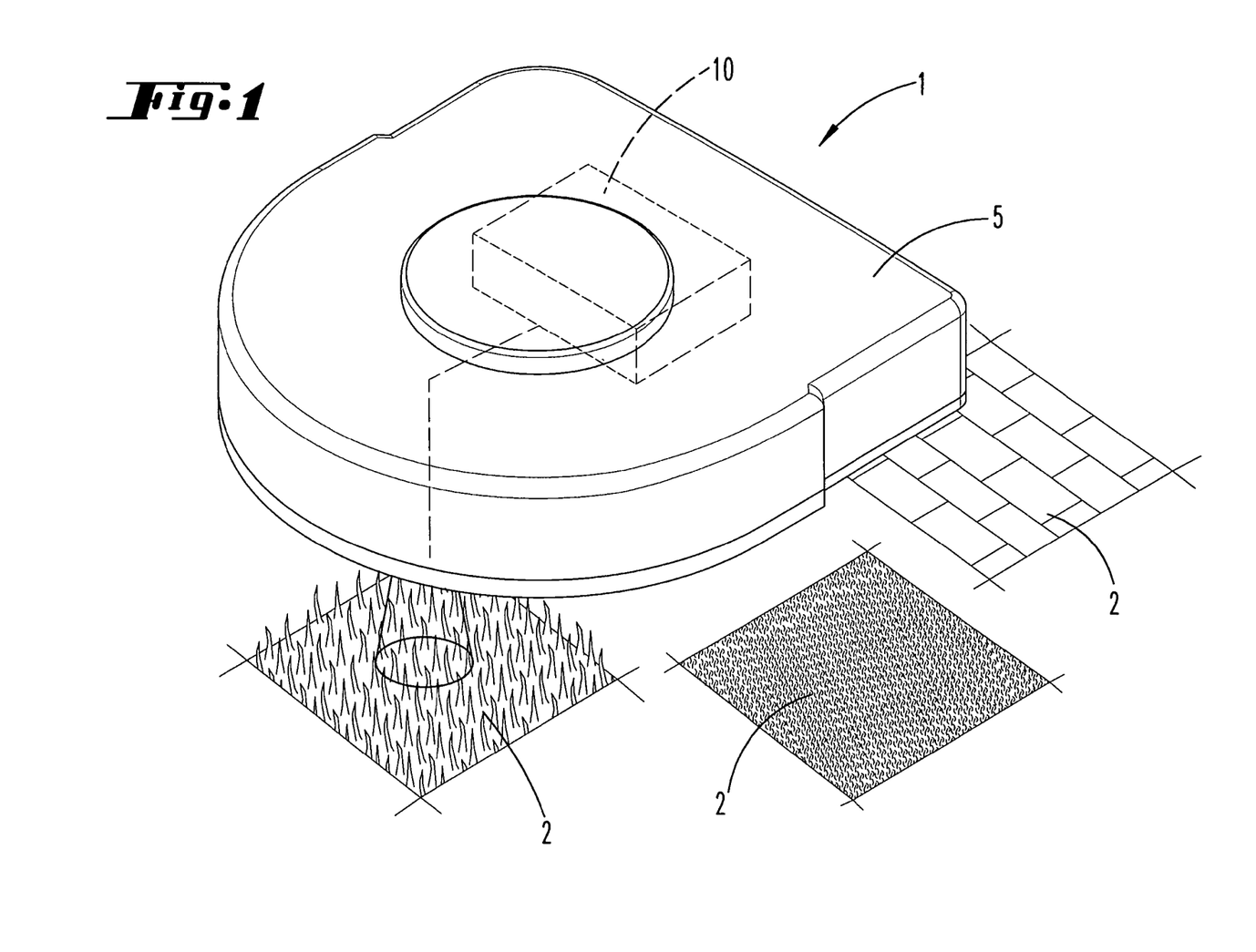
FIG. 1 shows an automatically traveling floor cleaning appliance in a perspective illustration, the different floor surfaces to be traveled over being illustrated schematically.

Illustrated and described in first instance with reference to FIG. 1 is a cleaning appliance 1 in the form of an automatically traveling floor cleaning appliance with a chassis that has electromotively driven travel wheels 3 on the lower side facing towards the floor 2 to be cleaned and that carries a brush 4 that likewise is driven electromotively and protrudes beyond the lower edge of the chassis bottom. The chassis is covered by an appliance cover 5, the cleaning appliance 1 of the illustrated embodiment preferably being circular in plan view.

Figure 2:
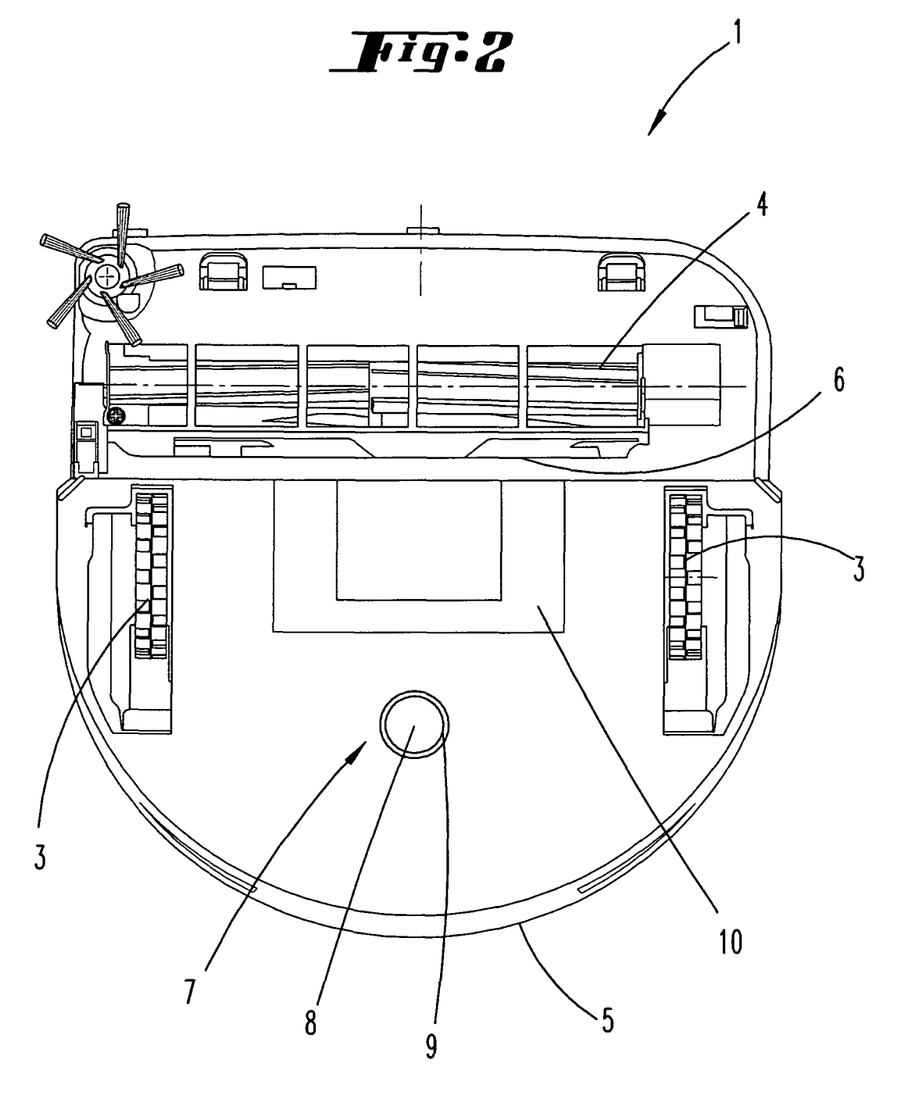
FIG. 2 shows the bottom view onto the floor cleaning appliance.

Furthermore, in addition or alternatively to the brush 4, the cleaning appliance 1 has a suction nozzle opening 6. In this case, furthermore, an electromotively driven suction fan motor is disposed in the cleaning appliance 1.

Electricity is supplied to the individual electrical components of the cleaning appliance 1 such as, in particular, the electric motor for the travel wheels 3, the electric drive for the brush 4, more preferably, the suction fan and, moreover, additional electronics provided in the appliance for controlling same, via a rechargeable battery that is not illustrated here.

The cleaning appliance 1 preferably has a traveling strategy that can be adapted, for example, to the detected surroundings and/or to the degree of soiling of the floor 2.

There is the need to adapt this traveling strategy to the type of floor covering, and moreover, preferably in combination with or alternatively thereto, to also adapt cleaning parameters such as, for example, the rotational speed of the brush 4 and/or the suction power, to the type of floor covering.

For this purpose, a device 7 in the form of an electronic camera 8 is provided on the underside of the chassis of the appliance for creating photographic pictures of the floor surface on which the cleaning appliance travels. An integral part of the device 7, in addition to the electronic camera 8, is a lighting element 9.

The lighting element 9 preferably emits a defined white light and is more preferably a white LED.

Figure 5:
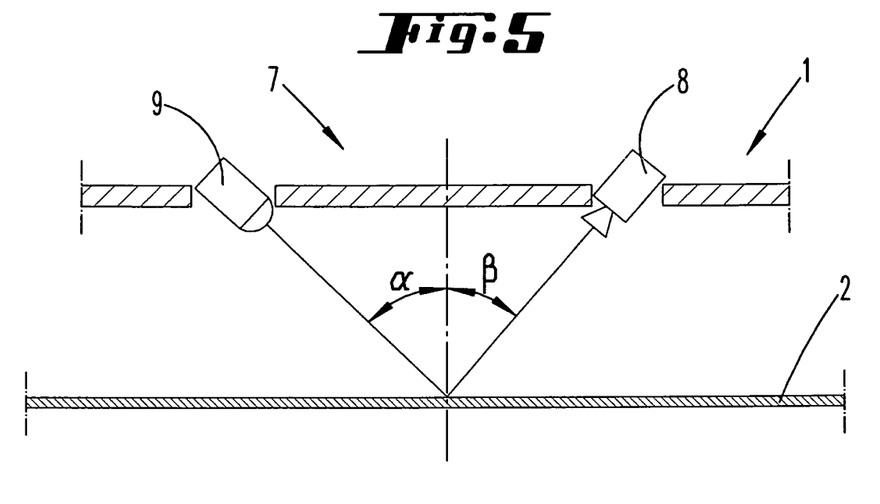
FIG. 5 shows, in a schematic vertical sectional view, the recording range of the floor cleaning appliance.

As can be seen from the schematic illustration in FIG. 5, the camera 8 and the lighting element 9 are preferably aligned at identical or comparable angles to a line oriented perpendicular to the floor 2, the angles of alignment alpha and beta, respectively, to the perpendicular line preferably ranging from 30 to 60 degrees.

Figure 3:
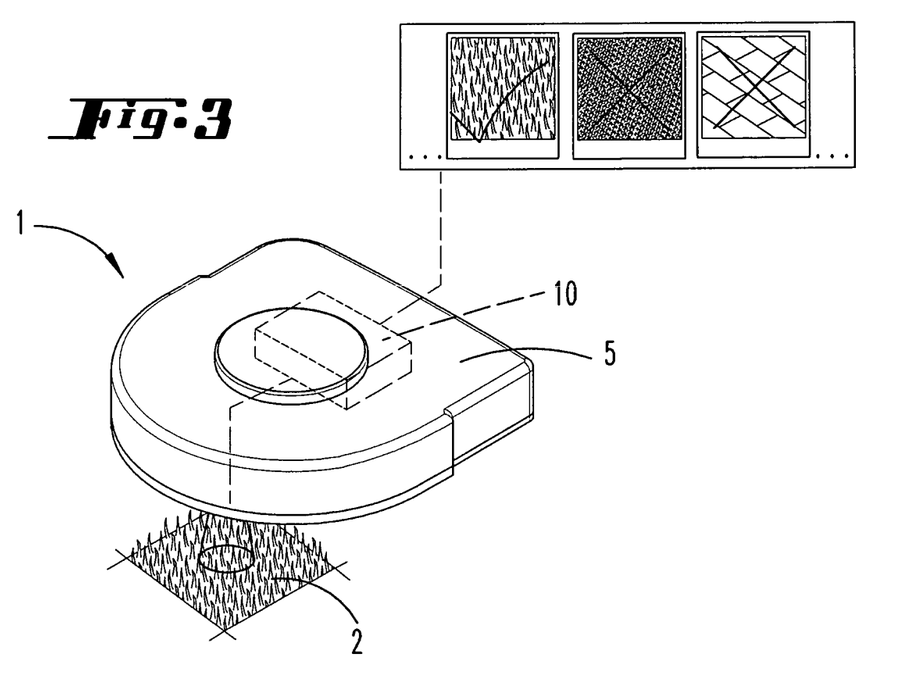
FIG. 3 shows a schematic illustration with regard to the creation of a photographic picture of the floor surface to be traveled on, and the evaluation of the picture.
Figure 4:
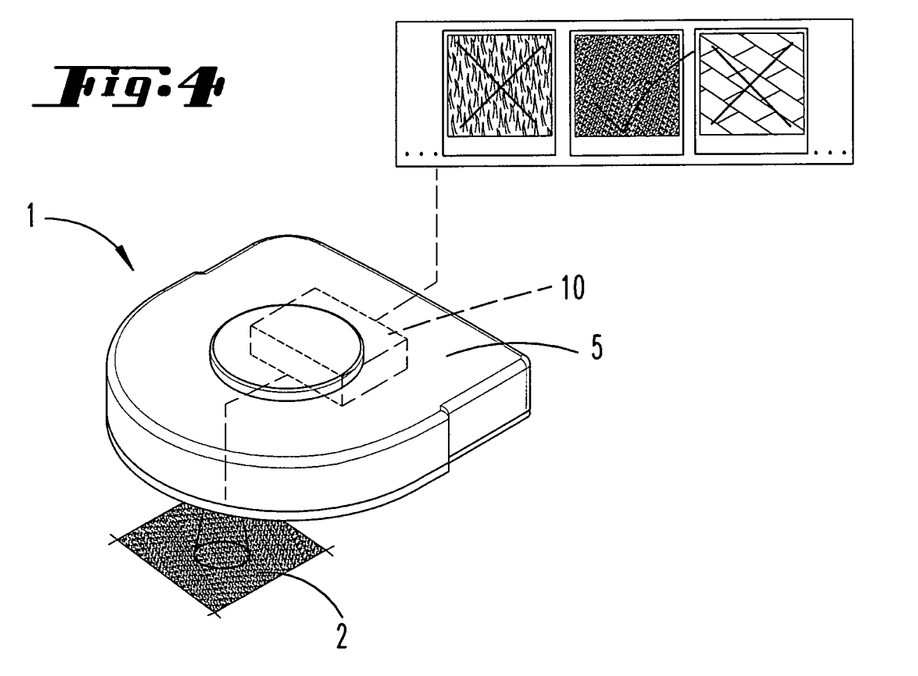
FIG. 4 shows an illustration corresponding to FIG. 3, the picture, and the evaluation of a floor surface that is changed with respect to the FIG. 3.

The created photographic picture of the floor surface is preferably evaluated within the floor cleaning appliance, further preferred within an integrated evaluation unit 10 with focus on certain features. For this, in particular methods and algorithms of digital image processing are available for extracting features from the individual pictures. Viewed in particular here are the brightness, the color and the structure of the photographic picture. Analyzed and evaluated pictures are preferably compared with features of a likewise preferred stored database (see schematic illustrations in the FIGS. 3 and 4). In dependence on the evaluated and identified floor pattern, a certain traveling strategy (for example, leaving the current floor covering) is initiated, and/or predetermined cleaning parameters are adapted to the detected floor covering.

Figure 6:
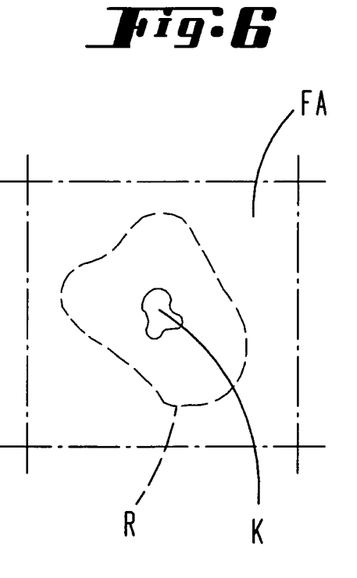
FIG. 6 shows an exemplary photographic picture of a floor surface with a reflection core area detected in the course of the evaluation within a reflection surface.

In a preferred embodiment, the identification of sealed surfaces, for example, (or tiled floors, for example) is done by observing the gloss. Floor surfaces that are sealed, i.e., that are waterproof to the greatest possible extent and are smooth, have a high gloss, i.e., a high reflectivity. Also, in the preferably digital picture FA, gloss can be seen as an indicator of a sealed surface. FIG. 6 shows a photographic picture FA of a tiled floor or wood floor area. A bright (white) core area K, which is illustrated with a solid line, is detected within the illuminated surface R, this being indicated with a dashed line. This core area K is preferably detected by means of pattern recognition algorithms.

Figure 7:
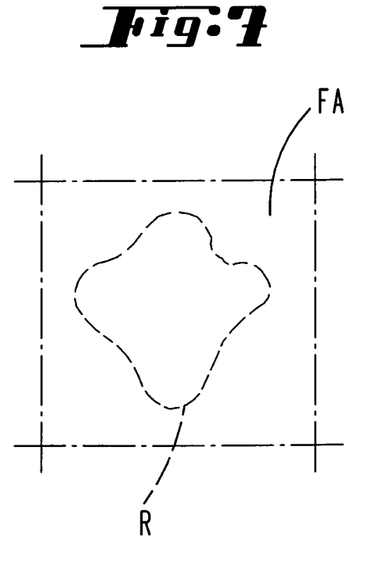
FIG. 7 shows an illustration corresponding to FIG. 6, but with regard to a picture of a floor surface without reflection core area.

FIG. 7 shows a photographic picture FA of a carpeted floor. This floor also has an illuminated surface R in first instance. However, since the carpet fibers greatly scatter the light, resulting in diffuse light, no core area K can be detected here.

Wood floors or floors laminated with wood are preferably identified in the color space. Known gesture recognition algorithms identify, for example, the face and hands of a person by forming an area from pixels, which are representative for a color range in the color space that is typical for human skin. Wood, for example, can be clearly identified in a comparable manner if corresponding color ranges in the color space have been determined via statistical methods.

Carpeted floors are preferably identified on the basis of the fiber structure. A carpet characteristically has a fiber structure. While it is difficult to detect this structure in the photographic picture of a velour carpet, a clear pattern can be seen in the case of a carpet having, in particular, pile threads with loose ends.

In a preferred embodiment, the above-described identification methods are combined with one another so as to clearly determine the floor covering in this manner.

The cleaning appliance 1 itself preferably determines the type of floor covering during automatic traveling and cleaning of the floor 2 and reacts automatically on the basis of predetermined parameters. Furthermore, this is in particular useful in the case of floor cleaning appliances that are also suitable for wet cleaning the floor 2, if needed. If, for example, a carpeted floor is detected, this surface is preferably avoided by a so-called wiping robot, or the application of moisture is at least interrupted.

Figure 8:
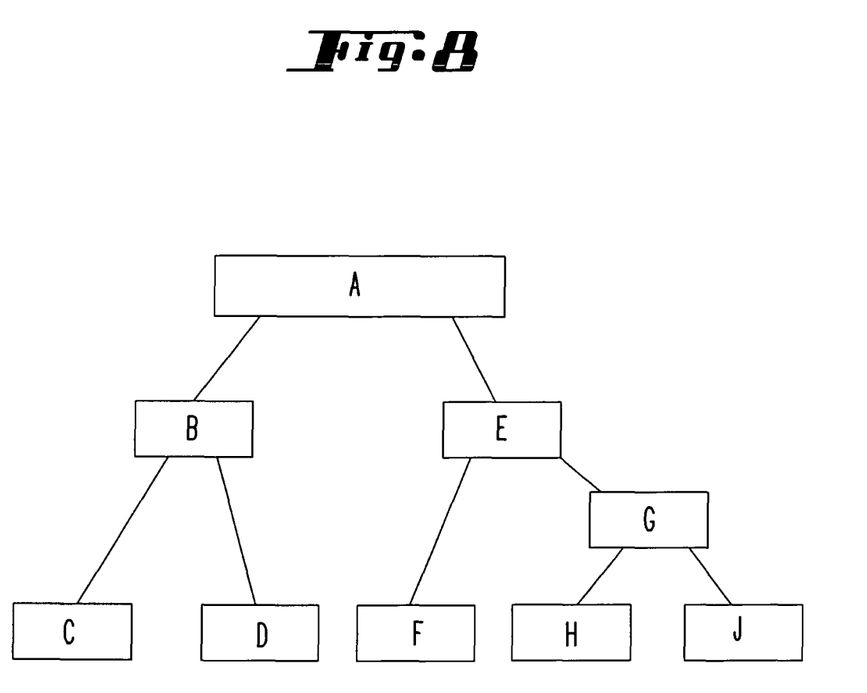
FIG. 8 shows a flow diagram regarding the preferably software-based decision-making for setting a traveling strategy and/or cleaning parameters.

FIG. 8 shows a decision flow diagram for an automatically deciding cleaning appliance 1. Starting from point A, it is in first instance determined whether a white core area K, corresponding to a reflection of the lighting element 9, can be seen in the illuminated surface R. If this is the case, a hard surface can be assumed and it is determined in point B via the color within the photographic picture if this is a wood color. If a wood color has been detected, this involves in particular a sealed wood floor or, for example, a laminate (point C), which, in a preferred embodiment with regard to the cleaning parameters to be set, results in that a low brushing power, i.e., low brush speed is set, and only little moisture is applied, if a liquid application device is provided.

If no wood color can be detected, this means that there is, for example, linoleum flooring or PVC flooring, or, alternatively, tiles, granite or sealed stoneware (point D).

Here too, a relatively low brush speed is preferably selected automatically. The application of moisture is normal in this case.

If no core area K was detected (point E) under point A, this results in first instance in the switching-off of the liquid application, if there is a corresponding device. Furthermore, this also results in first instance in an analysis of whether a wood color can be detected in the picture. If there is such a wood color, it is preferably an open-pored and thus diffusely reflecting wood floor (point F), whereupon preferably automatically, the brushing power is set to be low.

In the event that no wood color was detected, it is checked in the next point G whether a fiber structure can be seen in the photographic picture. If fibers are detected in the image (point H), it is preferably a carpet having long fibers, with the consequence that the brush 4 is preferably switched off. Such a carpeted floor is preferably only vacuum-cleaned. If no fibers can be detected in the image (point J), this preferably involves a velour carpet that needs to be cleaned with increased brushing power.

Figure 9:
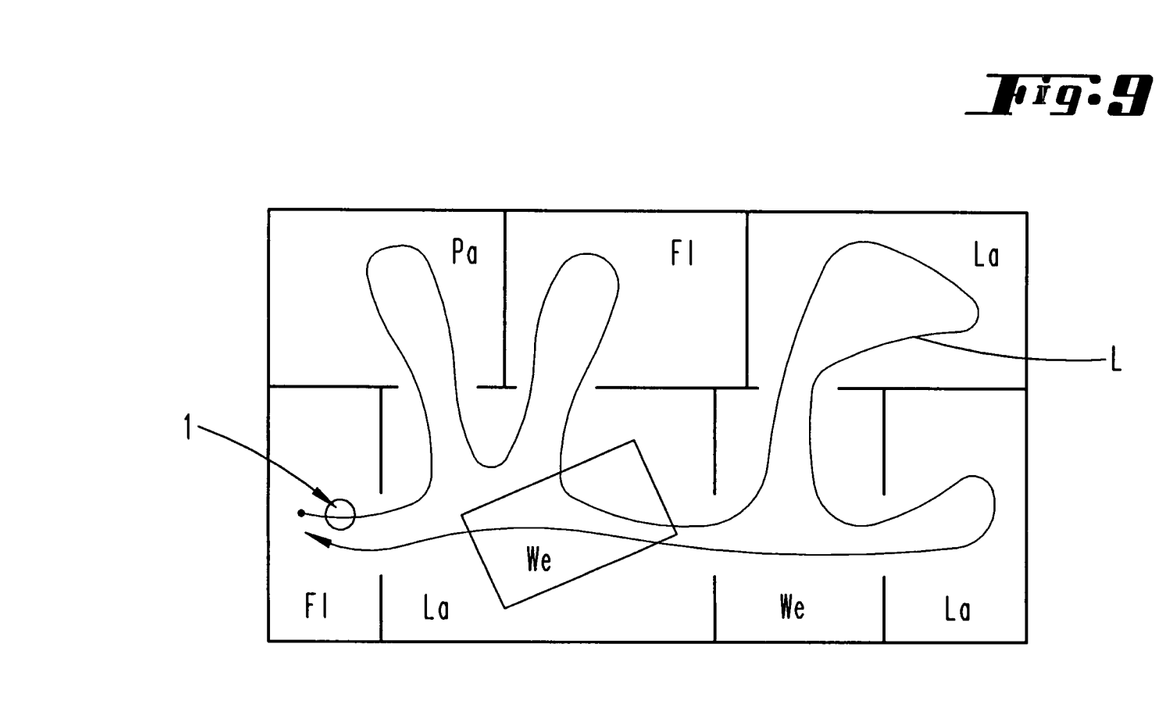
FIG. 9 shows the schematic layout of a multi-room apartment in plan view during a learning phase by the floor cleaning appliance for analyzing the floor surfaces.

FIG. 9 shows a schematic exemplary multi-room apartment in plan view. The floor surfaces of the individual rooms are configured differently, in particular by forming a parquet floor Pa, tiled floors Fl, laminate floors La, and a soft floor covering We. Moreover, in a room that has a laminate floor La, a carpet runner is laid which, accordingly, represents a soft floor covering We.

During a learning run or exploration run of the cleaning appliance 1 (see curved line L in FIG. 9), data are collected via the camera pictures and the following evaluation, which data are evaluated subsequently or immediately. For the collection of data, traveling takes place on all floor surfaces or floor types that are present. Illustrated is the trajectory of a user-controlled exploration during which the cleaning appliance 1 is controlled by the user by means of a remote control, for example.

The collected floor data are stored in a preferably non-volatile memory of the cleaning appliance 1, this being further preferred to take place in combination with the data on the surroundings from another stored map of the surroundings of the premises.

Figure 10:
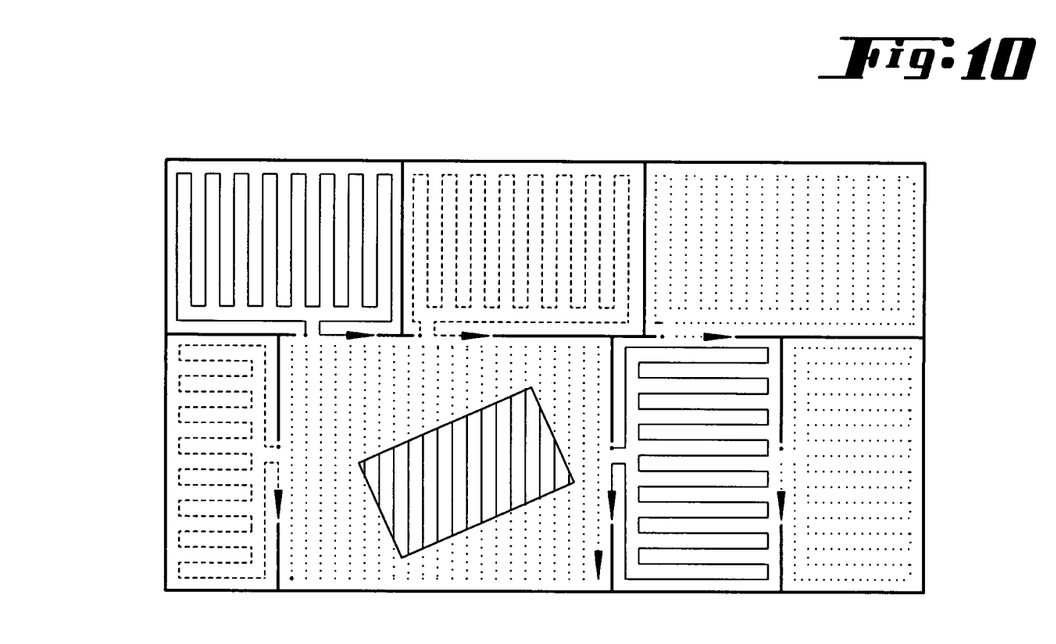
FIG. 10 shows an illustration corresponding to FIG. 9 but in relation to the cleaning phase.

A cleaning run of the cleaning appliance 1 as illustrated in FIG. 10 preferably takes place automatically using a map of the surroundings, it being further preferred that a predetermined traveling strategy be used.

FIG. 10 shows an exemplary cleaning run. During the cleaning run, the different cleaning parameters are adapted to the determined and stored floor data.

Thus, in a corresponding embodiment of the cleaning appliance 1, intense wet wiping (illustrated by the dashed line) is performed on tiled floors Fl, and gentle wet wiping (illustrated by the dotted line) with a liquid content per m² that is lower compared to tiled floors is carried out on laminate floors. Parquet floors Pa as well as soft floor coverings We are preferably only vacuum-cleaned (illustrated by the solid line).

More preferably, when a cleaning run is carried out on a surface over which the cleaning appliance has already traveled for analysis and which has been analyzed, additional pictures FA are created and evaluated. In FIGS. 9 and 10, a laminate floor La is partially covered with a soft floor covering We in the form a freely laid carpet runner. In the area of this floor subarea, a commensurately preferred cleaning is performed which—as illustrated by the solid line in the area of the soft floor covering—takes place here only by vacuum cleaning.

A displacement of such an exemplary carpet runner into another position relative to the laminate surface is detected in the case of a continuous analysis of the floor or the surface, which analysis also takes place during the cleaning run and results in a reaction of the cleaning appliance 1. If a change is detected with respect to the stored values, the cleaning appliance reacts, for example, with a gentle cleaning, for example, with deactivated brush and deactivated wet cleaning, this being done with reduced suction power, for example. Alternatively, this area can also be traveled over without cleaning it, and a corresponding message is transmitted to the user. It is also possible in this regard for the currently detected configuration to be compared with a stored configuration in the immediate vicinity of the current position of the cleaning appliance 1. If these configurations match, a provision is made in one embodiment that the respective cleaning parameters are used for the currently detected surface.

The embodiments described above serve to illustrate the entirety of the inventions covered by the patent application, each of which inventions independently improves upon the prior art at least through the following combinations of features, namely:

A cleaning appliance or floor care or floor treatment appliance that is characterized in that a picture FA can be evaluated with regard to the type of a surface formation, for example of a floor covering, and that an identified surface formation can be used with regard to a traveling strategy and/or with regard to a setting of cleaning parameters, such as floor clearance and/or size of secondary air openings, and/or brush speed.

A cleaning appliance or floor care appliance or floor treatment appliance that is characterized in that the evaluation can be carried out in the cleaning appliance 1 itself.

A cleaning appliance or floor care appliance or floor treatment appliance that is characterized in that the photographically captured surface can be illuminated by a lighting element provided in the floor cleaning appliance.

A cleaning appliance or floor care appliance or floor treatment appliance that is characterized in that the lighting element emits a defined white light.

A cleaning appliance or floor care or floor treatment appliance that is characterized in that the picture is a color picture and can be evaluated with regard to the color.

A cleaning appliance or floor care appliance or floor treatment appliance that is characterized in that the evaluation can be performed with regard to overexposed areas (white areas) in an image.

A cleaning appliance or floor care appliance or floor treatment appliance that is characterized in that a picture of a floor covering can be defined by the user as whether to be traveled on or not to be traveled on.

A method that is characterized in that pictures that have been taken are evaluated with regard to the surface formation and, in dependence on an evaluation, a traveling strategy and/or the setting of cleaning parameters, such as floor clearance and/or size of secondary air openings and/or brush speed, is carried out.

A method that is characterized in that prior to carrying out a traveling strategy or the like and in dependence on an evaluation of the pictures FA, traveling over a surface to be cleaned is carried out while creating the pictures FA, with no immediate reaction taking place to surface formations detected as being different.

A method that is characterized in that said traveling is carried out automatically or under the guidance of the user.

A method that is characterized in that the created pictures FA are analyzed by means of an evaluation software, if applicable at a time after traveling over the surface.

A method that is characterized in that a result of the evaluation is visualized for the user on a display or is communicated using a voice output.

A method that is characterized in that pursuing a traveling strategy in dependence on a performed evaluation is undertaken only after the user confirms the result of the evaluation communicated to the user.

A method that is characterized in that, when carrying out a cleaning run on a surface which has already been traveled over for analyzing and which has been analyzed, additional pictures FA are created and evaluated.

REFERENCE LIST

| 1 | Cleaning appliance | FA | Picture |
|---|---|---|---|
| 2 | Floor | Fl | Tiled floor |
| 3 | Travel wheel | La | Laminate floor |
| 4 | Brush | Pa | Parquet floor |
| 5 | Appliance cover | We | Soft floor covering |
| 6 | Suction nozzle opening | α | Angle |
| 7 | Device | β | Angle |
| 8 | Camera | | |
| 9 | Lighting element | | |
| 10 | Evaluation unit | | |
| A | Point | | |
| B | Point | | |
| C | Point | | |
| D | Point | | |
| E | Point | | |
| F | Point | | |
| G | Point | | |
| H | Point | | |
| I | Point | | |
| J | Point | | |
| K | Core area | | |
| L | Line | | |
| R | Surface | | |

The invention claimed is:

1. A traveling cleaning appliance or floor care appliance or floor treatment appliance, the appliance comprising:
   a camera configured to create photographic pictures of a surface to be traveled on, and
   a microcontroller comprising software configured to evaluate a picture taken by the camera with regard to the type of a floor covering,
   wherein the software is configured to formulate a traveling strategy depending on the type of the floor covering,
   wherein the software is configured to set cleaning parameters selected from the group consisting of a floor clearance, a size of secondary air openings, and a brush speed depending on the type of the floor covering, and
   wherein the software is configured to perform a reflectivity evaluation of the floor covering and/or a statistical evaluation of characteristic patterns or grains of the floor covering in a color space.

2. The cleaning appliance or floor care appliance or floor treatment appliance according to claim 1, wherein the evaluation can be carried out in the cleaning appliance itself.

3. The cleaning appliance or floor care appliance or floor treatment appliance according to claim 1, wherein the photographically captured surface can be illuminated by a lighting element that is provided in the cleaning appliance.

4. The cleaning appliance or floor care appliance or floor treatment appliance according to claim 3, wherein the lighting element emits a defined white light.

5. The cleaning appliance or floor care appliance or floor treatment appliance according to claim 1, wherein the picture is a color picture and can be evaluated with regard to the color.

6. The cleaning appliance or floor care appliance or floor treatment appliance according to claim 1, wherein the evaluation can be performed with regard to overexposed areas (white areas) in an image.

7. The cleaning appliance or floor care appliance or floor treatment appliance according to claim 1, wherein a picture of a floor covering can be defined by the user as whether to be traveled on or not to be traveled on.

8. The appliance according to claim 1, wherein the software is configured to evaluate overpixelled areas of a picture taken by the camera.

9. The appliance according to claim 1, wherein the type of the floor covering is selected from the group consisting of carpet and wood.

10. A method for operating a traveling cleaning appliance or a floor care appliance or floor treatment appliance, the appliance comprising a camera configured to create photographic pictures of a surface to be traveled on, the appliance also comprising a microcontroller comprising software configured to evaluate a picture taken by the camera with regard to a type of a floor covering, the method comprising steps of:
   taking a picture with the camera of a floor covering of the surface;
   evaluating via the software a type of the floor covering;
   formulating via the software a traveling strategy depending on the type of the floor covering;
   setting cleaning parameters for the appliance depending on the type of the floor covering, the cleaning parameters comprising a floor clearance and/or a size of secondary air openings and/or a brush speed; and
   performing via the software a reflectivity evaluation of the floor covering and/or a statistical evaluation of characteristic patterns or grains of the floor covering in a color space.

11. The method according to claim 10, wherein the picture is taken as the appliance travels over the surface to be cleaned, with no immediate reaction taking place to surface formations detected as being different.

12. The method according to claim 11, wherein said traveling is carried out automatically or under the guidance of the user.

13. The method according to claim 10, further comprising a step of: displaying on a display a result of the evaluation or communicating a result of the evaluation using a voice output.

14. The method according to claim 10, further comprising steps of:
   confirming via a user of the appliance a result of the evaluation; and
   pursuing the traveling strategy of the appliance on the surface only after the user confirms the result of the evaluation.

15. The method according to claim 10, further comprising steps of:
   carrying out a cleaning run on the surface according to the traveling strategy,
   creating, via the camera, additional pictures of the surface during the cleaning run, and
   evaluating via the software the additional pictures.

16. A cleaning system comprising:
   a traveling cleaning appliance or floor care appliance or floor treatment appliance, the appliance comprising a camera configured to create photographic pictures of a surface to be traveled on, and
   a microcontroller disposed externally from the appliance and comprising software configured to evaluate a picture taken by the camera with regard to a type of a floor covering, the microcontroller being configured to communicate wirelessly with the appliance, wherein the software is configured to formulate a traveling strategy for the appliance depending on the type of the floor covering, wherein the software is configured to set cleaning parameters for the appliance depending on the type of the floor covering, the cleaning parameters being selected from the group consisting of a floor clearance, a size of secondary air openings, and a brush speed, and wherein the software is configured to perform a reflectivity evaluation of the floor covering and/or a statistical evaluation of characteristic patterns or grains of the floor covering in a color space.

\* \* \* \* \*